United States Patent [19]

Payne

[11] Patent Number: 5,543,006
[45] Date of Patent: Aug. 6, 1996

[54] CONTINUOUS STRUCTURE FORMING METHOD

[76] Inventor: LeRoy Payne, 3300 Nicholas La., Molt, Mont. 59057

[21] Appl. No.: 345,565

[22] Filed: Nov. 25, 1994

Related U.S. Application Data

[63] Continuation-in-part of Ser. No. 239,540, May 9, 1994, which is a continuation-in-part of Ser. No. 870,927, Apr. 20, 1992, Pat. No. 5,330,603, which is a continuation-in-part of Ser. No. 753,344, Aug. 30, 1991, Pat. No. 5,145,282, which is a continuation-in-part of Ser. No. 521,442, May 10, 1990, Pat. No. 5,049,006, which is a continuation-in-part of Ser. No. 417,501, Oct. 5, 1989, Pat. No. 4,955,760, which is a continuation-in-part of Ser. No. 235,205, Aug. 23, 1988, Pat. No. 4,872,784.

[51] Int. Cl.[6] .............................. B32B 5/02; B32B 5/30
[52] U.S. Cl. .......................... 156/177; 156/276; 264/34
[58] Field of Search ........................ 156/167, 177, 156/246, 276, 500, 550, 551; 264/34, 171.13, 177.13; 427/209

[56] References Cited

U.S. PATENT DOCUMENTS

| | | | |
|---|---|---|---|
| 2,473,528 | 6/1949 | Hoover | 156/167 |
| 2,927,623 | 3/1960 | Huisman et al. | 156/276 |
| 3,266,966 | 8/1966 | Patchell | 156/167 |
| 3,734,814 | 5/1973 | Davis, Sr. et al. | 156/276 |
| 3,861,982 | 1/1975 | Wilson et al. | 156/276 |
| 4,955,759 | 9/1990 | Payne | 156/550 |
| 4,955,760 | 9/1990 | Payne | 156/550 |

*Primary Examiner*—Geoffrey L. Knable
*Attorney, Agent, or Firm*—Arthur L. Urban

[57] ABSTRACT

A method of forming a continuous structure includes the steps of flowing a first liquid reactive resin forming material over a base surface, forming a first thin substantially uniform layer thereof and gelling the first layer. A second liquid resin forming material is flowed through an orifice under pressure forming a liquid stream thereof. The liquid stream is gelled to form a continuous filament with structural integrity as it advances toward the first gelled layer. The filament is contacted with the first layer and distributed thereover in a preselected pattern forming a porous non-woven filament blanket. A particulate solid material is distributed substantially uniformly over the filament blanket. A third liquid resin forming material is flowed over the blanket forming a second thin substantially uniform layer of the third liquid resin forming material and the layer is gelled. The resulting freshly formed structure is compressed and positioned in a final configuration while the structure is flexible and adhesive after which curing is completed. Also, apparatus forming the structure as well as the structure itself.

15 Claims, 1 Drawing Sheet

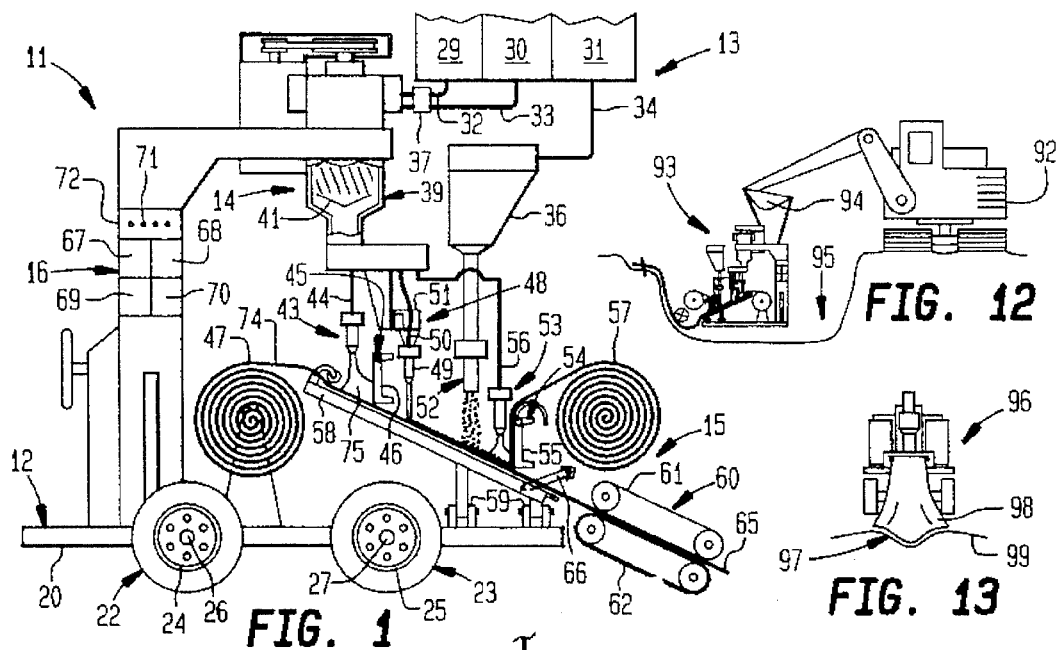
FIG. 1
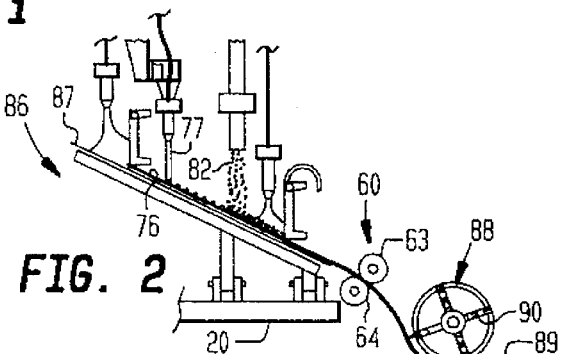
FIG. 2
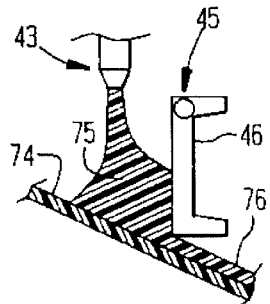
FIG. 3
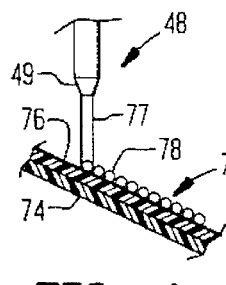
FIG. 4
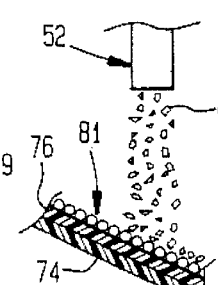
FIG. 5
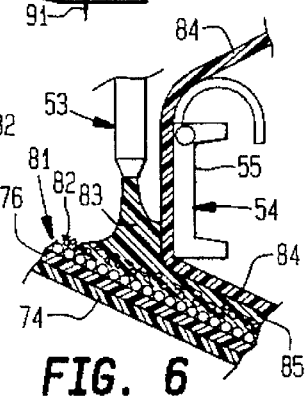
FIG. 6
FIG. 7 FIG. 8 FIG. 9
FIG. 10 FIG. 11

CONTINUOUS STRUCTURE FORMING METHOD

This application is a continuation-in-part of pending application Ser. No. 239,540, filed May 9, 1994, which in turn is a continuation-in-part of application Ser. No. 870,927, filed Apr. 20, 1992, now U.S. Pat. No. 5,330,603, which in turn is a continuation-in-part of application Ser. No. 753,344, filed Aug. 30, 1991, now U.S. Pat. No. 5,145,282, which in turn is a continuation-in-part of application Ser. No. 521,442, filed May 10, 1990, now U.S. Pat. No. 5,049,006, which in turn is a continuation-in-part of application Ser. No. 417,501, filed Oct. 5, 1989, now U.S. Pat. No. 4,955,760, which in turn is a continuation-in-part of application Ser. No. 235,205, filed Aug. 23, 1988, now U.S. Pat. No. 4,872,784.

This invention relates to a novel continuous structure forming method and apparatus and to a new continuous structure produced thereby.

The inventions of the applicant's early patents listed above provide novel methods and apparatus to produce at a job site structures such as liners and pipe for the collection, storage and/or distribution of water and other liquids. The apparatus employed, which normally is transported to a job site, is complex and sophisticated requiring major capital investment.

The invention of applicant's recent patent listed above, U.S. Pat. No. 5,330,603, provides novel method and structure that can be produced with a minimum of machinery at the job site. Thus, the structure and method of the invention can be employed efficiently and economically for patching and for small jobs even at remote locations.

While the applicant's earlier patents mention the use of recycled or waste materials as additives in structures, most efforts of others have been directed to separating the waste into its primary components and the combining of similar materials into the same product again. Various governmental and private agencies have provided incentives such as subsidies and grants in attempting to develop commercially feasible products and procedures for recycling waste. To date, only very few waste materials are routinely recycled on an economical basis.

The structure produced with the method and apparatus described in applicant's latest application listed above, Ser. No. 239,540, can include major proportions of recycled, waste or other materials which are readily available at a job site. These structures are of high quality and may exhibit properties not usually found in products formed with conventional ingredients.

The present invention provides a novel method, apparatus and structure which overcome the shortcomings of previous expedients. In addition, the method, apparatus and structure provide features and advantages not found in earlier technology.

A great variety of different structures of the invention can be produced more easily and conveniently with the method and apparatus of the present invention. The method may be conducted by individuals with only limited mechanical skills and experience. Structures can be produced by such individuals safely and efficiently without supervision. The configuration and composition of the structure can be changed easily.

The method of the invention can be modified to provide structures with variations in physical dimensions, composition and surface appearance, etc. Even with such changes, uniform high quality can be maintained without difficulty.

A novel method of the present invention for forming a continuous structure includes the steps of flowing a first liquid reactive resin forming material over a base surface, Forming a first thin substantially uniform layer therefrom and gelling the first layer. A second liquid resin forming material is flowed through an orifice under pressure to form a liquid stream thereof. The liquid stream is gelled to form a continuous filament with structural integrity as it advances toward the first layer. The filament is contacted with the first layer and distributed thereover in a preselected pattern to form a porous non-woven filament blanket.

Thereafter, a particulate solid additive material is distributed substantially uniformly over the filament blanket. A third liquid resin forming material is flowed over the blanket forming a second thin substantially uniform layer thereof which then is gelled. The resulting freshly formed structure is compressed and positioned in a final configuration while it is flexible and adhesive and the curing thereof is completed.

Advantageously, a continuous filament is formed which has a generally circular, rectangular or oval cross section. Preferably, the continuous filament has a central passage along its length. Also, the filament may vary in cross section along its length.

The continuous filament is distributed over the first gelled layer to completely or partially cover the first layer in a preselected pattern. Also, it may be advantageous to distribute the filament in a preselected variable pattern. The pattern forming the non-woven porous blanket may vary in density and/or thickness along its length and/or width as desired.

The method of the invention may include preconditioning of raw material prior to forming the first, second and/or third resin forming materials therewith. Also, the use of a major proportion of the solid additive particles is desirable. In addition, air or an inert gas may be entrained within the structure during its formation.

Benefits and advantages of the novel method and apparatus of the present invention will be apparent from the following description and the accompanying drawings in which:

FIG. 1 is a side view of one form of mobile structure forming apparatus of the present invention;

FIG. 2 is a fragmentary side view of another form of apparatus of the invention;

FIG. 3 is an enlarged fragmentary side view of the apparatus shown in FIG. 1 during an early step in the method of the invention;

FIG. 4 is an enlarged fragmentary side view of the apparatus shown in FIG. 1 during an intermediate step in the method of the invention;

FIG. 5 is an enlarged fragmentary side view of the apparatus shown in FIG. 1 during a further step in the method of the invention;

FIG. 6 is an enlarged fragmentary side view of the apparatus shown in FIG. 1 during a later step in the method of the invention;

FIG. 7 is a greatly enlarged schematic illustration of a cross section of a filament formed with the apparatus of the invention;

FIG. 8 is a greatly enlarged schematic illustration of a cross section of a different filament formed with the apparatus of the invention;

FIG. 9 is a greatly enlarged schematic illustration of a cross section of another filament formed with the apparatus of the invention;

FIG. 10 is a greatly enlarged schematic illustration of a cross section of a further filament formed with the apparatus of the invention;

FIG. 11 is a greatly enlarged schematic illustration of a fragmentary longitudinal section of a filament formed with the apparatus of the invention;

FIG. 12 is a schematic illustration showing apparatus of the invention in use in the field; and FIG. 13 is a schematic illustration showing another apparatus of the invention in use in the field.

As shown in FIG. 1 of the drawings, one form of novel mobile continuous structure forming apparatus 11 of the present invention includes a supporting portion 12, a raw material supplying portion 13, a mixing portion 14, a matrix forming portion 15 and a control portion 16.

The supporting portion 12 of the structure forming apparatus 11 includes at least one base section 20. Carriage means 21 operatively associated with base section 20 includes at least one transverse axle assembly 22, and as shown in FIG. 1, two axle assemblies 22,23 with wheels 24,25 mounted on free ends 26,27 thereof.

The raw material supplying portion 13 of the apparatus 11 includes a plurality of reservoirs 29,30,31 operatively connected with the supporting portion 12. The reservoirs 29,30 are connected independently with the mixing portion 14 through flexible conduit means 32,33. The raw material supplying portion advantageously also includes a gravity feed hopper 36 receiving material from reservoir 31 through conduit 34. Preferably, heating means 37 is disposed along the length of the conduit means 32,33.

The mixing portion 14 of the structure forming apparatus 11 of the invention includes a mixing chamber 39 mounted on the base section 20. A rotatable mixing element 41 is disposed within the mixing chamber as shown in FIG. 1. The rotatable mixing element 41 advantageously is centrally aligned within the mixing chamber 39.

The matrix forming portion 15 of the apparatus 11 includes first mixture distributing means 43 adjacent a first outlet 44 of the mixing chamber 39. The first mixture distributing means 43 includes a first elongated barrier member 45 disposed closely adjacent to a matrix forming path through the apparatus and substantially perpendicular thereto.

Advantageously, the barrier member 45 as shown is a pivotable elongated blade member 46 inclined to the matrix forming path in the direction of advance. Plastic film dispensing means shown as film supply roll 47 preferably is disposed adjacent the first barrier member 45.

The matrix forming portion 15 further includes filament distributing means 48 including an orifice 49 disposed below a second outlet 50 of the mixing chamber 39 and operatively connected thereto. Reciprocating means 51 is associated with the distributing means 48.

Additive particle distributing means 52 is disposed subsequent to the filament distributing means 48. Second mixture distributing means 53 including a second elongated barrier member 54 shown as pivotable elongated blade member 55 is disposed below a third outlet 56 of the mixing chamber 39. Advantageously, plastic film dispensing means shown as film supply roll 57 is disposed adjacent the second barrier member 54.

The matrix forming portion 15 advantageously includes a shallow tray member 58 disposed below the outlets 44,50,56 of the mixing chamber 39 and below the matrix forming path through the apparatus. Preferably, the tray member is disposed in an inclined plane. Advantageously, the tray member 58 is connected to base section 20 through pivot connectors 59 to simplify orientation of the tray.

Pressure applying means 60 is disposed subsequent to the second mixture distributing means 54. The pressure applying means 60 may include a belt 61 extending along the matrix forming path and particularly cooperating belts 61,62 disposed above and below structure 65 with at least one of the belts being a pattern forming belt. Most advantageously, cooperating belts 61,62 extending along the matrix forming path are disposed in planes substantially parallel to tray member 58.

Alternatively, or in addition, the pressure applying means 60 may include at least one roller shown in FIG. 2 as opposed rollers 63,64 disposed perpendicular to the matrix forming path and extending beyond edges of the structure. Roller 63 and/or 64 advantageously includes a patterned surface. A cutter member 66 (FIG. 1) may be located prior to or subsequent to the pressure applying means.

To produce high quality structures of the invention, it is important that all of the steps be carefully coordinated by control portion 16. The control portion 16 of the structure forming apparatus 11 of the invention includes programmable memory means 67 and actuating means 68 responsive thereto in combination with coordinating means 69 to control the operation of pumps, valves, drives, etc. Preferably, the coordinating means includes a process controller 70 that initiates changes in the flows of materials and speeds of drives to bring variations therein back to the rates specified in the programs present in the memory 67.

This coordination commonly is achieved through the transmission of information such as digital pulses from the monitors and/or sensors at the control components to the process controller 70. The operating information is compared with the preselected programming parameters stored in the memory 67. If differences are detected, instructions from the controller change the operation of the components to restore the various operations to the preselected processing specifications.

To form a structure of the invention employing apparatus 11 as shown in FIG. 1, the design of the structure desired first is established. Then, the design parameters are programmed into the memory 67.

To start the operation of the apparatus 11, buttons and/or switches 71 of a control panel 72 are depressed to activate the memory 67 and the other components of the control portion 16. The coordinating means 69 energizes actuating means 68 in the preselected sequences of the program stored in the memory 67. This causes a liquid reactive resin forming material to be advanced from a reservoir 29 through a conduit 32 into mixing chamber 39. Simultaneously, other minor ingredients e.g. colors, catalysts, etc. from reservoir 30 advance through conduit 33 into mixing chamber 39 and are mixed with the resin forming material advancing therethrough by rotatable mixing element 41.

The resulting liquid mixture flows through a first mixing chamber outlet 44 onto a base surface shown as a moving plastic film 74 being delivered from roll 47. With first elongated barrier member 45 disposed closely adjacent to the plastic film 74 and transversely across the width thereof (FIGS. 1 and 2), a pool 75 of the mixture collects behind the barrier member.

As the coated plastic film advances under the first barrier member 45, excess mixture is removed and a thin substantially uniform layer 76 is retained on the film. After the layer has gelled, a second resin forming material flows from outlet 50 of mixing chamber 39 through orifice 49 under pressure to form a liquid stream 77 therefrom.

The liquid stream is permitted to gel to form a continuous filament 78 with structural integrity as it advances toward the first layer 76 moving thereunder on plastic film 74. Filament 78 is placed in contact with the first layer and distributed thereover in a preselected pattern 79 with reciprocating means 51 to form a non-woven porous filament blanket 81.

Thereafter, a particulate solid additive material 82 which has been transferred from reservoir 31 through conduit 34 to a gravity fed hopper 36 is delivered onto the filament blanket 81 advancing thereunder. The particles are distributed substantially uniformly over the filament blanket.

A third liquid resin forming material from mixing chamber 39 flows through a third outlet 56 thereof over filament blanket 81 filling the interstices between the filaments and forming a continuous layer thereover. With a second longitudinal barrier member 54 disposed closely adjacent to the filament blanket and positioned transversely across the blanket, a pool 83 of the third mixture collects behind the barrier member.

Simultaneously with the advance of the coated structure under the second barrier member 54, a second plastic film 84 from a roll 57 is inserted between the structure and the barrier member so the major faces of the structure are protected by the upper and lower films. As the coated structure advances under the second barrier member 54, the excess mixture is removed and a second thin substantially uniform layer 85 is retained on the structure and the second layer is allowed to gel.

The resulting structure is compressed by passing it between belts 61,62 and/or rollers 63,64 to ensure that the components thereof bear tightly against one another. This produces a dense structure with strong bonding between all components.

If it is desired to form a preslected patterned surface, the structure is passed into contact with a patterned belt 61 or roller 63 or a combination of belts 61,62 or rollers 63,64. Advantageously, a pattern is formed on the surface by applying pressure for an extended period of time. This may be accomplished by using cooperating belts 61,62 of considerable length.

Since the filament blanket is formed in situ as an integrally formed component of the structure, the bonding of the resin forming mixtures with the filamentary mass is much stronger than would result with hand building methods in which the surfaces of pre-formed components have become desensitized by exposure to the atmosphere. Thus, the method of the invention allows the use of lesser quantities of resin forming materials to achieve equivalent structural properties.

The in situ formed filamentary pattern also may be utilized to inspect and/or monitor a structure internally. This may be accomplished through the use of signal transmitting materials in the formation of the filament. In this way, the filament can function as an optical fiber to allow inspection internally both during the forming of the structure and thereafter when the structure is in use.

Similarly, if the filament includes an open central passage, a micro-miniature TV camera can be passed along the passage to monitor the structure during and/or after fabrication. Other sensing components such as lasers also can be employed for the same or other purposes.

The inclusion of upper and/or lower plastic films may facilitate the installation of novel structures of the invention under adverse weather conditions or below water or other liquids. Also, the flowing of resin through film openings can provide adhesion of the structure to a subsurface (not shown).

The apparatus 86 shown in FIG. 2 is similar to apparatus 11 with the exception that plastic films are not disposed over the upper and lower major surfaces of the structure. Instead, the apparatus 86 includes a stationary low friction temporary support surface 87 on which first layer 76 is formed. It is important that resin forming materials with rapid gelling and curing capability be utilized to ensure that the structure will have structural integrity before being separated from the support surface 87.

Apparatus 86 also includes one or more rotatable wheels 88 (FIG. 2) preferably mounted on brackets (not shown) extending forwardly from the base section 20. These wheels are oriented to press edges of a structure 89 against a supporting surface such as the ground (not shown). Preferably, the wheels include hollow spoke members 90 which include pins or nails 91 with mechanisms (not shown) that drive the pin through a structure edge and into the underlying supporting surface to fix the position of the structure.

FIGS. 3–6 show succeeding steps in the formation of one form of the structure of the invention with apparatus 11. FIG. 3 shows the formation of the first layer 76, and FIG. 4 illustrates the formation of the filament blanket 81. In FIG. 5, the solid additive particles 82 are being deposited on the filament blanket 81 and FIG. 6 shows the formation of second layer 85.

FIGS. 7–10 schematically illustrate different cross-sectional filament configurations. FIG. 7 shows an oval, FIG. 8 a circle and FIG. 9 a circular configuration with a central passage. In FIG. 10, a generally rectangular cross section is shown. FIG. 11 illustrates a fragmentary longitudinal filament section which can be used to form an irregular pattern.

FIG. 12 illustrates the use of continuous structure forming apparatus of the invention in combination with a power shovel. The apparatus 93 is suspended from a bucket 94 of a shovel 92 movable along a bank of a ditch 95. The apparatus lays continuous lengths of the structure of the invention across the ditch from one bank to the other in an overlapping relationship.

One end of each length of the structure is staked to the ditch bank and the structure delivered from the apparatus which is disposed closely to the ditch surface. This arrangement is especially useful under windy conditions.

FIG. 13 illustrates an end view of a structure forming apparatus 96 straddling a narrow ditch 97 with banks 99 as a continuous structure 98 is positioned longitudinally along the ditch.

The liquid reactive resin forming material employed to produce structures of the invention is selected to be capable of reaction to form the particular resin components desired in the final structure. Advantageously, the resin is a thermosetting resin such as a polyurethane or polyester. Should a polyurethane be desired, one reservoir may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material advantageously is employed in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

The above description and the accompanying drawings show that the present invention provides a novel method, apparatus and structure which overcome the shortcomings of previous expedients and in addition, provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method, apparatus and structure described in detail above and shown in the drawings within the scope of the present invention. The method steps, apparatus components and types of materials employed can be changed to meet specific process and structural requirements. For example, the number and disposition of porous filament blankets and patterns can be different. Also, particulate additives may be incorporated in the resin forming mixtures and preformed reinforcing members included in the structure.

These and other changes can be made in the method, apparatus and structure of the invention provided the functioning and operation thereof are not adversely affected. Therefore, the scope of the present invention is to be limited only by the following claims.

What is claimed is:

1. A method of forming a continuous structure including the steps of flowing a first liquid reactive resin forming material over a base surface, forming a first thin substantially uniform layer of said first resin forming material, gelling said first layer, flowing a second liquid resin forming material through an orifice under pressure, forming a liquid stream of said second resin forming material, gelling said liquid stream to form a continuous filament with structural integrity as it advances toward said first gelled layer, contacting said filament with said first layer, distributing said filament over said first layer in a preselected pattern thereby forming a porous non-woven filament blanket, distributing a particulate solid material substantially uniformly over said filament blanket, flowing a third liquid resin forming material over said blanket, forming a second thin substantially uniform layer of said third liquid resin forming material, gelling said second layer, compressing the resulting freshly formed structure, positioning said compressed structure in a final configuration while said structure is flexible and adhesive and thereafter completing curing thereof.

2. A method of forming a continuous structure according to claim 1 including the step of distributing a continuous filament with a generally circular cross section over said first gelled layer.

3. A method of forming a continuous structure according to claim 1 including the step of distributing a continuous filament with a generally rectangular cross section over said first gelled layer.

4. A method of forming a continuous structure according to claim 1 including the step of distributing a continuous filament with a generally oval cross section over said first gelled layer.

5. A method of forming a continuous structure according to claim 1 including the step of distributing a continuous filament with a central passage along its length over said first gelled layer.

6. A method of forming a continuous structure according to claim 1 including the step of distributing a continuous filament with a variable cross section along its length over said first gelled layer.

7. A method of forming a continuous structure according to claim 1 including the step of distributing a continuous filament over said first gelled layer in a preselected variable pattern.

8. A method of forming a continuous structure according to claim 7 wherein said variable pattern varies in density.

9. A method of forming a continuous structure according to claim 7 wherein said variable pattern varies in thickness.

10. A method of forming a continuous structure according to claim 1 wherein said second liquid resin forming material is a signal transmitting material.

11. A method of forming a continuous structure according to claim 1 including the step of preconditioning raw materials prior to flowing said first, second and third liquid resin forming material.

12. A method of forming a continuous structure according to claim 1 including the step of distributing a sufficient amount of said particulate solid additive material over said filament blanket to provide a major proportion thereof in said structure.

13. A method of forming a continuous structure according to claim 1 including the step of entraining air within at least one of said resin forming materials.

14. A method of forming a continuous structure according to claim 1 including the step of flowing said first liquid resin forming material over a plastic film.

15. A method of forming a continuous structure according to claim 14 including the step of continuously advancing said plastic film.

* * * * *